UNITED STATES PATENT OFFICE.

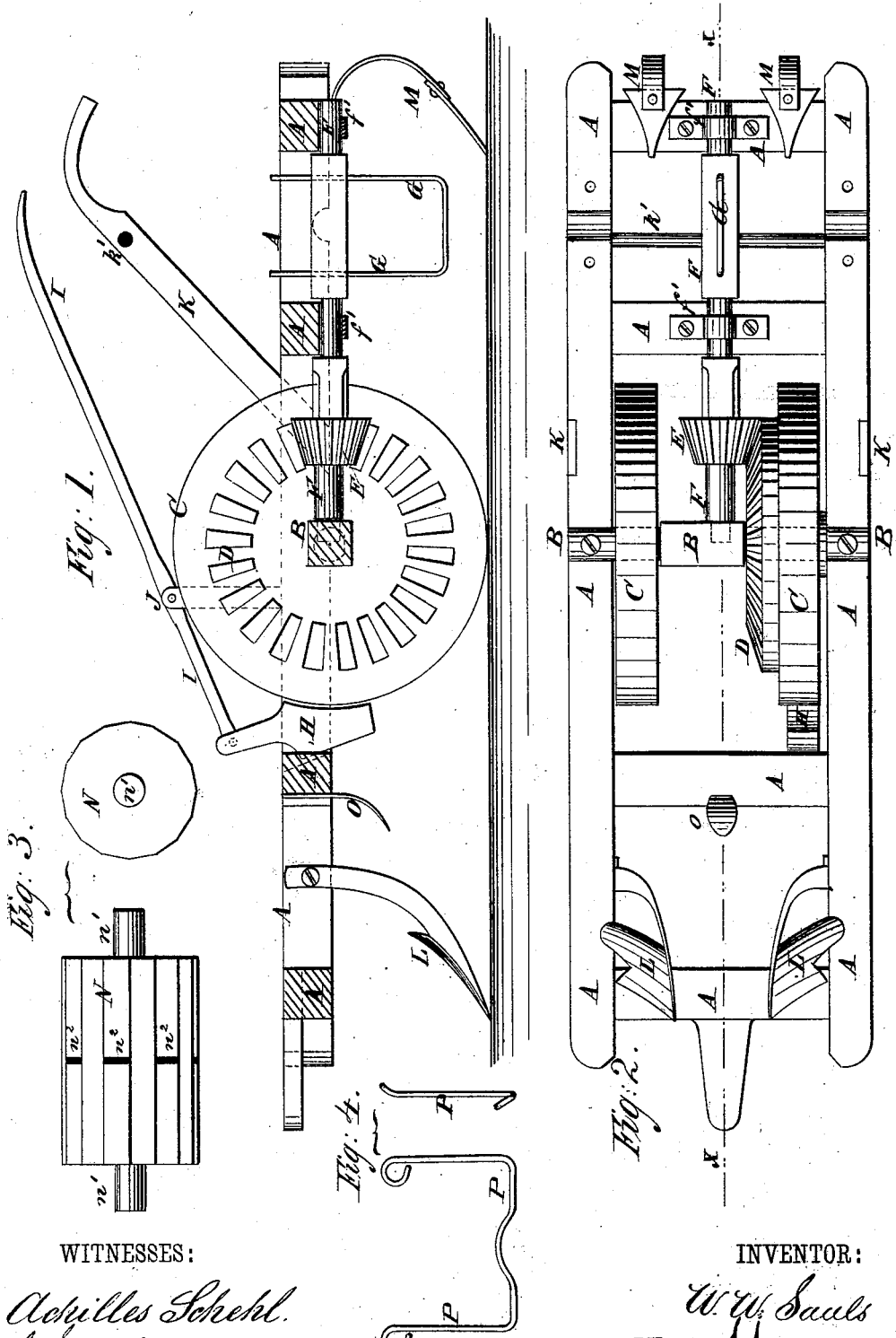

WILLIAM W. SAULS, OF DENISON, TEXAS.

IMPROVEMENT IN COTTON-CHOPPERS.

Specification forming part of Letters Patent No. 221,106, dated October 28, 1879; application filed April 28, 1879.

*To all whom it may concern:*

Be it known that I, WILLIAM WILLIS SAULS, of Denison, in the county of Grayson and State of Texas, have invented a new and useful Improvement in Cotton-Choppers, of which the following is a specification.

Figure 1 is a vertical longitudinal section of my improved machine, taken through the line $x\ x$, Fig. 2. Fig. 2 is a bottom view of the same. Fig. 3 is a detail side and end view of the seed-dropping cylinder. Fig. 4 is a detail side and end view of the covering-bar.

Similar letters of reference indicate corresponding parts.

The invention consists in combining a chopper, mechanism for operating it, a brake, and a hand-lever, as hereinafter described.

A represents the frame of the machine, which is formed of two side bars connected by four cross-bars.

To the side bars of the frame A, between the inner cross-bars, are attached the ends of an axle, B, upon which, at the inner sides of the said side bars revolve two wheels, C.

To the inner side of one of the wheels C is attached a bevel-gear wheel, D, the teeth of which mesh into the teeth of a small bevel-gear wheel, E, attached to the forward part of the shaft F. The forward end of the shaft F revolves in bearings in the middle part of the axle B, and its rear part revolves in bearings $f'$, attached to the under sides of the rear cross-bars of the frame A.

To the shaft F, between the rear cross-bars of the frame A, are attached the arms of the chopper G, which arms are designed to be secured to the shaft F by nuts and set-screws, so that the chopper G may be adjusted to cut deeper or shallower in the ground, as may be desired.

H is a brake-block, which is so formed as to fit upon the face of the drive-wheel C, and between the forward inner cross-bar of the frame A and the said wheel. The upper end of the brake-block H is pivoted to the forward end of the lever I, which is pivoted to a standard, J, attached to a side bar of the frame A.

The rear end of the lever I extends back along one of the handles K, so that it can be readily reached and operated by the plowman. The handles K are attached at their forward ends to the side bars of the frame A, and their rear parts are connected by a round, $k'$.

With this construction, when the cotton is thin the plowman lowers the brake-block H, and thus stops the chopper until the thin place has been passed, when he raises the said brake-block H, and allows the chopper to again operate.

L are two barring-off plows, the standards of which are attached to the forward parts of the side bars of the frame A, so as to bar off the row before it is operated upon by the chopper G.

To the rear cross-bar of the frame A are attached two plows or sweeps, M, to dirt the plants after the row has been chopped to a stand. The three operations of barring off, chopping the plants to a stand, and dirting the plants are thus performed by the same machine, and at one passage along the row.

In order that the machine may work properly it is necessary that the seed should be planted or drilled in a straight line. To insure this I have constructed a planting attachment for my improved machine, which I will now describe.

N is a hollow cylinder, provided with journals $n'$ at its ends, which revolve in bearings attached to the side bars of the frame A, either at the place where the axle B is attached, or at the rear part of the said side bars.

The wheels C, axle B, and chopper-shaft F, and the plows L and M, are detached when the planting-cylinder N is used, and the bearings $f'$ of the chopper-shaft F may be used for the journals $n'$ of the cylinder N.

Around the center of the cylinder N is formed a row of short cross-slots, $n^2$, through which the seed escapes to the ground as the said cylinder N is rolled forward.

A channel is opened to receive the seed by a plow, O, the standard of which is attached to the center of the inner forward cross-bar of the frame A.

The seed is covered by a bar or board, P, attached to the rear cross-bar of the frame A, and which has its lower edge concaved, as shown in Fig. 4, so as to draw the seed into the furrow opened by the plow O, and at the same time cover it, so that the plants will come up in a straight row. A riding attachment may be connected with the rear end of the frame A, if desired.

Having thus described my invention, I claim as new and desire to secure by Letters Patent—

In a cotton-chopper, the combination of the lever I, standard J, wedge-shaped block H, and the transporting and driving wheel C, having gearing D, with the frame A, constructed with a recess or slot opposite the periphery of the wheel to receive said block, substantially as and for the purpose specified.

WILLIAM WILLIS SAULS.

Witnesses:
 J. T. MUNSON,
 I. N. LINLEY.